United States Patent [19]
DeVincent et al.

[11] 3,869,152
[45] Mar. 4, 1975

[54] TUBE MOUNTING ASSEMBLY

[75] Inventors: Patsy DeVincent, Dayton; James R. Steck, Brookville, both of Ohio

[73] Assignee: General Motors Corporation, Detroit, Mich.

[22] Filed: Mar. 27, 1974

[21] Appl. No.: 455,049

[52] U.S. Cl. .............. 285/137 R, 285/158, 285/256
[51] Int. Cl. .............................................. F16l 39/00
[58] Field of Search ............ 285/137 R, 137 A, 189, 285/205, 206, 208, 193, 158, 414, 415, 174, 256, 406, 405, 363, 364, 368, 412

[56] References Cited
UNITED STATES PATENTS

| | | | |
|---|---|---|---|
| 1,231,928 | 7/1917 | Miller et al. | 285/137 R X |
| 1,363,713 | 12/1920 | Broido | 285/189 X |
| 1,692,154 | 11/1928 | Broido et al. | 285/189 X |
| 2,475,468 | 7/1949 | Andrews | 285/137 R X |
| 3,792,729 | 2/1974 | Perry | 285/137 R X |

FOREIGN PATENTS OR APPLICATIONS

| | | | |
|---|---|---|---|
| 576,232 | 5/1924 | France | 285/137 R |
| 6,397 | 0/1914 | Great Britain | 285/137 R |

Primary Examiner—Thomas F. Callaghan
Attorney, Agent, or Firm—Arthur N. Krein

[57] ABSTRACT

A tube mounting assembly as, for example, to connect the hose connection tubes of a pair of hoses to a refrigerant compressor used in a vehicle air conditioning system, the compressor having inlet and outlet openings therein to receive the ends of the hose tubes. Each tube is connected at one end to a hose and is provided at its opposite end with an upset annular bead adjacent to its free end which is of a suitable length to act as a pilot tube portion for insertion into an opening in the compressor, the annular bead on the tube being sandwiched between the legs of a fold-around clamp against which an O-ring seal encircling the free end of the tube is seated. A pair of slotted tube brackets are mounted in interlocking relationship with each other about each tube on the opposite side of the fold-around clamp from the O-ring seal, the brackets being apertured to receive at least one hold-down fastener whereby this assembly can be secured to the compressor with each O-ring seal being sandwiched between a fold-around clamp and the housing of the compressor.

4 Claims, 4 Drawing Figures

PATENTED MAR 4 1975

3,869,152

TUBE MOUNTING ASSEMBLY

This invention relates to conduit connections and, in particular, to an arrangement for connecting conduits, such as hose tubes, to the flat port surface of associated accessories, such as the conduit block or head of a refrigerant compressor as used in vehicle air conditioning systems.

Specifically, this invention relates to a hose tube mounting assembly to permit mounting of the conduit or tube fitting of such hoses to the refrigerant compressor of an automotive vehicle air conditioning system in a manner to provide for controlled hose departure orientation relative to the compressor while at the same time permitting off-line assembly or field serviceability of the hose connection.

In present day vehicle air conditioning systems, the refrigerant hoses, for example, from the discharge port and to the inlet port of the refrigerant compressor of such a system are each connected to the compressor by means of a tube fitting, each such tube fitting having one end thereof fixed to the flexible hose and its other end connected to the compressor. Such a tube fitting connection to the compressor is made either by means of a male-female threaded tube coupling or it may be fixed, as by brazing, to a compressor connector block which would also have a short pilot tube fixed thereon adapted to enter a corresponding sized hole or port in the compressor housing, such a compressor connector block then being fixed as by means of a bolt or spanner clamp to the machined pad or boss having the hole therein on the compressor housing.

When using a male-female threaded tube coupling to fix such as tube fitting to the compressor, it is difficult to maintain the proper departure orientation of the tube fitting relative to the compressor, such tube fittings normally being bent, when necessary, to provide a desired departure orientation relative to the compressor housing, such departure orientation being necessary due to the limited availability of space in the engine compartment of present day automotive vehicles. In addition, such male-female threaded tube couplings are subject to a number of potential leakage paths for the escape of refrigerant fluid. When the tube and compressor connector block arrangement is used for securing the tube to the refrigerant compressor, this arrangement also provides an excessive number of potential leakage paths for the loss of refrigerant fluid during service as, for example, around the brazed connections. In addition, in both of these prior art arrangements, substantial machining is required to fabricate either the male-female threaded tube coupling or the compressor connector block.

It is therefore the principal object of this invention to provide an improved hose tube mounting assembly for securing a conduit, such as a hose tube, to an accessory whereby a desired departure orientation of the conduit relative to the accessory can be readily maintained.

Another object of this invention is to provide an improved hose tube mounting assembly in which possible leakage paths in the hose mounting assembly, as secured to an accessory, are reduced to a minimum.

Still another object of this invention is to provide an improved hose tube mounting assembly which may be inexpensively fabricated with portions of such an assembly being fabricated from sheet metal stampings.

A still further object of this invention is to provide an improved hose tube mounting assembly which permits off-line assembly or field serviceability of the hose connection.

These and other objects of the invention are obtained by means of a hose tube mounting assembly in which a fold-over clamp is positioned on a tube with the legs of the fold-over clamp abutting opposite sides of an upset annular bead formed adjacent to the coupling end of a tube, an O-ring seal being positioned to encircle the free end of the hose tube adjacent the upset bead with the O-ring seal abutting against the leg of the fold-over clamp adjacent thereto, a pair of slotted tube mounting brackets being mounted in interlocking relationship with each other about the tube on the opposite side of the fold-around clamp from the O-ring seal, means being provided on the brackets for receiving a fastener whereby this assembly can be secured, for example, to a compressor with a suitable aperture being provided in the compressor to receive the free end of the tube whereby this assembly can be secured to the compressor with the O-ring seal sandwiched in sealing engagement between a surface of the compressor and the fold-over clamp.

For a better understanding of the invention, as well as other objects and further features thereof, reference is had to the following detailed description of the invention to be read in connection with the accompanying drawings, wherein.

Figure 1:
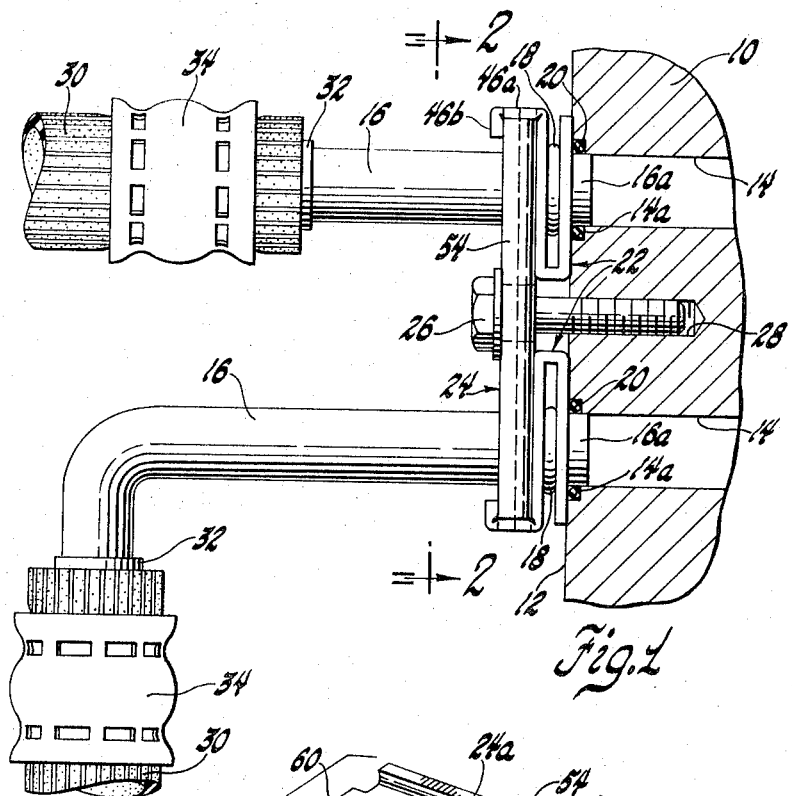
FIG. 1 is a view, partly in section, showing a hose tube mounting assembly in accordance with the invention used to secure a pair of hose tubes to the flat port surface of an associated accessory, such as a refrigerant compressor.
Figure 2:
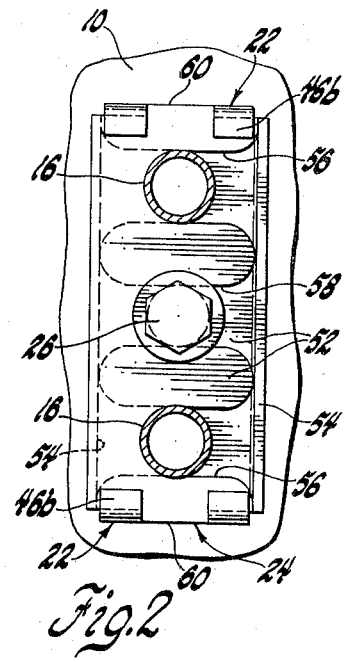
FIG. 2 is a view taken along line 2—2 of FIG. 1.

Referring first to FIG. 1, there is illustrated the housing 10 of a compressor or similar accessory having a machined pad or boss 12 with a pair of bored passages 14 therein, one of which may be the inlet passage and the other the outlet passage for the compressor. The bore diameter of each of the passages 14, at least for a preselected distance adjacent to the boss 12, is sized such as to each slidably receive the coupling end of a tube 16 associated therewith. For purposes of illustration only, one of the tubes 16, the tube inserted into the top bored passage 14, as seen in FIG. 1, is illustrated as a straight tube while the other tube is shown as having a right angle bend therein intermediate its ends to show different departure orientations of the tubes relative to the machined boss 12. It should be realized, however, that these tubes could be bent, as desired, to obtain any departure orientation required for a tube relative to the machined boss 12.

In accordance with the invention, each tube 16, preferably thin walled and of uniform thickness, is provided at one end, the coupling end, with an annular bead 18, which may be upset, as shown, or otherwise provided on the tube to extend radially out from the nominal outside diameter of the main body portion of the tube, this bead 18 being spaced a predetermined distance from the one end of the tube, the right-hand or coupling end as seen in FIG. 1, to provide a pilot portion 16a for entry into a bored passage 14 of the housing 10. An O-ring 20, to provide a fluid seal, is positioned to encircle the pilot portion 16a for abutment against one leg of a clamp, generally designated 22, secured to the tube to engage opposite sides of the bead 18 of the tube. A split flange connector 24 consisting of a pair of slotted tube mounting brackets of plates 24a interlocked together about each tube on opposite sides of the clamp 22 from O-ring 20 to abut against the clamp 22 is used to retain the pair of tubes shown in fixed axial position relative to the housing 10 with the O-ring 20 compressed in sealing engagement between the clamp 22 and a surface of the housing 10, the split flange connector 24 being fixed to the housing by a suitably threaded fastener, such as machine screw 26, extending through a suitable aperture provided for this purpose in each of the interconnected plates 24a for threaded engagement into the threaded aperture 28 in housing 10.

Although the tube 16 may be any suitable type rigid conduit, each tube, for purposes of illustration only, is shown as being a hose connector tube for a hose 30. For this purpose, each tube at the end opposite the coupling end which includes pilot portion 16a of the tube is provided, for example, with a barbed end portion, not shown, adapted to be inserted into the internal passage or inner tube of a hose 30 with the end of the hose positioned to abut against an annular collar 32 provided for this purpose on each tube, a collar or sleeve 34 being positioned to encircle the hose and crimped into engagement therewith whereby the hose is axially retained on the tube.

In the preferred embodiment of the invention shown, each clamp 22, made of a suitable material and fabricated, for example, as a metal stamping, is substantially U-shaped in its assembled configuration as secured to a tube 16 and includes a first leg 40 and a second leg 52 connected by an integral bight or connecting leg 44. In addition, in order to provide for proper departure orientation of a tube, each clamp 22 is also provided with a positive positioning tab, which in the embodiment illustrated in a return bent tab 46 provided by tab portions 46a and 46b formed integral with the free ends of leg 42. If desired, score lines 47 can be provided on the clamp to facilitate bending of the tabs 46a and 46b.

Figure 3:
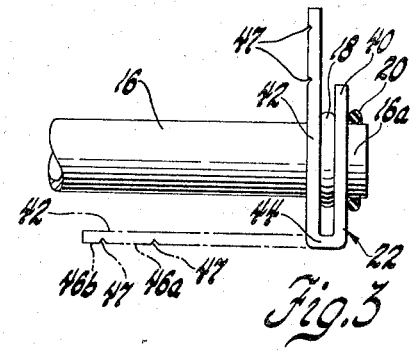
FIG. 3 is a view corresponding to a portion of FIG. 1 showing the assembly of a fold-over clamp to a tube; and, FIG. 4 is an exploded, perspective view of the hose tube mounting assembly of FIG. 1 prior to its assembly to an associated accessory.
Figure 4:
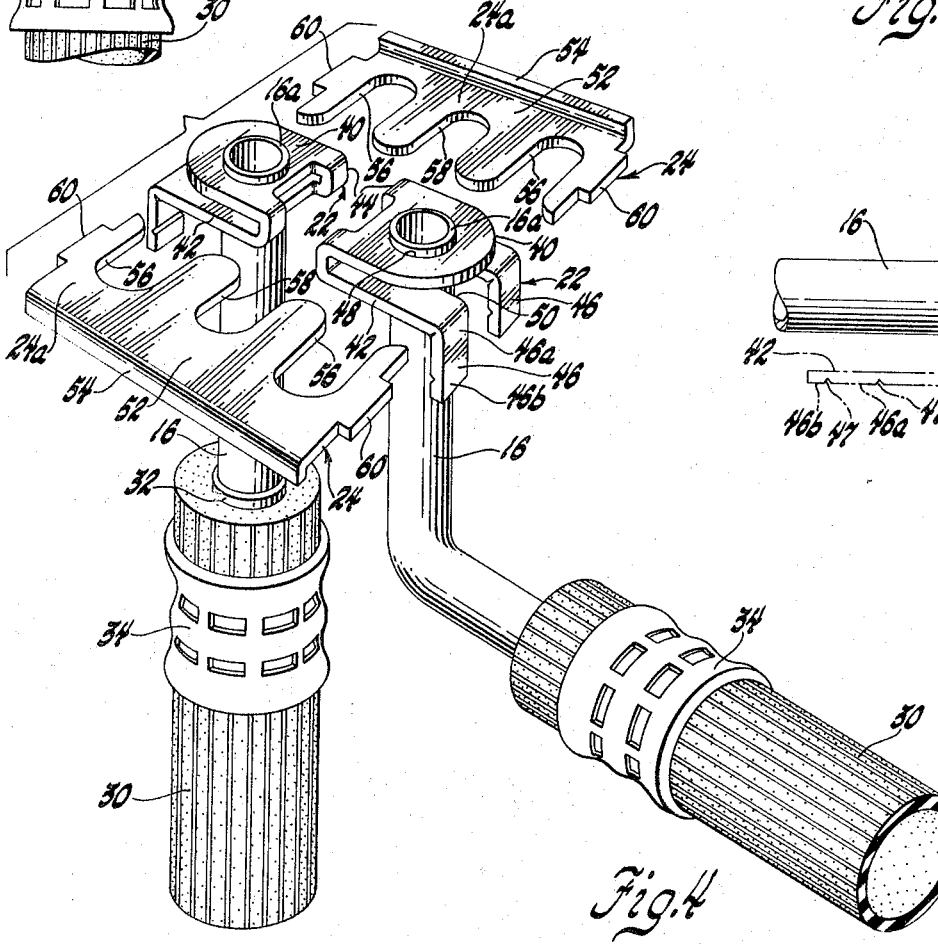

As best seen in FIG. 4, the leg 40 is provided with a round aperture 48 of a diameter to slidably receive the pilot portion 16a of a tube 16 so that when this clamp is fitted onto the tube, the surface of this leg 40 facing the coupling end or pilot portion of the tube will provide, in effect, a continuous, annular, radial extending seat for the O-ring 20. The leg 42, including the tab portions 46a and 46b extending from the free end of this leg in the preferred embodiment illustrated, is bifurcated to provide a slot 50 of a length and width to slidably receive a tube 16. As best seen in FIG. 3, the clamp 22, in its configuration as originally fabricated as by stamping, is not U-shaped, the leg 42 in the as fabricated condition is ideally at least positioned at an angle of approximately 90° to leg 40, the position shown in broken lines in FIG. 3, whereby the leg 40 can first be assembled to the tube 16 by passing the free end 16a of the tube through the aperture 48 in leg 40 with the leg 40 then moved axially on the tube until it abuts against the free end tube side of the bead 18 after which the leg 42 is folded back over the tube, with the tube in slot 50, until the U-shaped configuration shown in solid line in FIG. 3 is obtained with the legs 40 and 42 positioned substantially parallel to each other with the bead 18 securely sandwiched therebetween so that the tube is secured against rotation relative to clamp 22.

In the embodiment illustrated, the tube mounting brackets 24a, forming the split flange connector 24, can be sheet metal stampings and are constructed to permit connecting one or more tubes 16 to an accessory, such as to the housing 10 of a compressor, the connector in the embodiment shown being used to secure two tubes 16. As shown, each of the brackets 24a, consisting of a flat mounting flange 52, with an integral upstanding flange 54 at one longitudinal or trailing edge thereof, is provided with a pair of spaced apart slots 56 extending from the opposite longitudinal or leading edge of the flange 52, these slots 56 extending transversely across a ptredetermined distance of the flange 52 for a purpose to be described. Each of the slots 56 is of a width so as to permit the flange 52 to slidably receive a tube 16 with which it cooperates and is of a length such when these brackets 24a are assembled together with their flanges 54 inverted with respect to each other so that one bracket can be considered the top bracket and the other bracket being considered the bottom bracket, with reference to FIG. 4, the flange 54 on one bracket will act as a stop for the leading edge of the other bracket, the arcuate portion of each slot in the brackets being sized to partly encircle a tube 16.

A suitable aperture means, such as slot 58, is also provided in each flange 52 of a bracket whereby as a pair of these brackets 24a are assembled together, a suitable aperture is provided therethrough, intermediate the slots 56 in the embodiment disclosed to receive the machine screw 26.

After assembly of a pair of brackets 24a to a tube 16, the tube mounting brackets are then preferably secured together in a suitable manner to provide a unitary split flange connector 24 assembly and then the positioning tab of each clamp 22 is fixed to the brackets 24a. For example, the brackets can be riveted together and then the positioning tabs of the clamps 22 can be clamped over a suitable portion of the brackets 24a provided for this purpose. However, as shown in the preferred embodiment illustrated, this is accomplished by providing the transverse ends of the flange 52 of each bracket 24a with lock tabs 60 extending out longitudinally from the main body of the bracket 24a so that when a pair of these brackets are assembled together, the lock tabs 60 on the cooperating brackets will extend through the slot 50 in the leg 42 of a clamp 22 to permit the tab portions 46a and 46b of the clamp to be deformed about the transverse ends of the brackets 24a with the lock tab 60 sandwiched between the tab portion 46a extending from each portion of the bifurcated leg 42 of the clamp 22. With this arrangement, the positioning tab of each clamp 22 is used to effect both proper departure orientation of a tube by securing the tube against rotation relative to the brackets 24a and to effect interconnection of a pair of brackets 24a into a unitary split flange connector 24 for the tubes.

It is to be realized that a positioning tab can be provided, as desired, on a clamp 22 to effect locking of the tube associated with such a clamp against rotation relative to the split flange connector 24, it only being necessary that the positioning tab be properly orientated relative to the desired departure bend in the tube 16 during assembly of the clamp 22 to the tube 16 with appropriate means then being provided on the split flange connector 24 to fix this orientation relative to it. A clamp 22 is suitably fixed to a tube 16 so that the positioning tab on the clamp is properly aligned with respect to the desired departure orientation or bend of a tube so that upon further assembly of the clamp 22 to the mounting brackets 24a, proper orientation will be maintained. This orientation can be maintained upon assembly of a clamp 22 to a tube 16 by sandwiching the bead 18 between the legs of a clamp with sufficient force so that relative rotation between the tube and the clamp is prevented and, if desired, further bonding can be effected as by providing an annular brazed bond, not shown, between bead 18 and clamp 22.

In the embodiment of the invention illustrated in FIG. 1, each of the O-rings 20 is shown as being seated in a counterbore 14a coaxial with a bored passage 14 in housing 10 but, if desired, the O-rings 20 can be seated against the machined pad 12 with the pilot portion 16a of a tube 16 suitably elongated for positioning of the O-ring in this manner.

Although the split flange connector 24 shown is used to secure two tubes 16 to housing 10, it will be apparent to those skilled in the applicable art that the connector 24 can be readily modified so that any number of tubes may be secured in this manner. For example, a single tube can be secured to housing 10 by providing a single central slot 56 in each of the brackets 24a with suitable apertures, such as a pair of slots 58 on opposite sides of slot 56 to receive a pair of fasteners, such as machine screws 26.

What is claimed is:

1. A tube mounting assembly for securing N number of tubes to an accessory housing, the accessory housing having an N number of bored passages to receive the tubes, each of the tubes having an annular upset bead adjacent one end of the tube with a pilot tube portion extending therefrom for insertion into one of the bored passages, said tube mounting assembly including a fold-over clamp for each tube having a first leg and a second leg connected at one end by an integral bight, said first leg having an aperture therein to receive the pilot tube portion of a tube and the second leg having a slot therein of a size to slidably receive the tube, said fold-over clamp being secured to a tube with the pilot tube portion of a tube inserted into the aperture in said first leg and with the bead of the tube securely sandwiched between said first leg and said second leg, an O-ring positioned to encircle the pilot tube portion of each tube in abutment against said first leg of said fold-over clamp associated with the tube and, a split flange connector consisting of two brackets of identical shape, said brackets each having an N number of tube receiving slot openings extending from one side thereof to receive said N number of tubes, said brackets being positioned in opposed, overlapping, fixed relation to each other with the N number of tubes positioned in said slots whereby the tubes are entrapped between said pair of brackets, said brackets being positioned on the opposite side of each fold-over clamp from said O-ring associated therewith, each said fold-over clamp further including positioning tab means for engagement with said brackets to lock each said fold-over clamp and therefore a tube associated therewith against rotation relative to said brackets, said brackets having aperture means therethrough to receive fastener means for securing said brackets to the accessory housing with said clamp and O-ring sandwiched therebetween with said O-ring in sealing engagement with said first leg of the fold-over clamp and the accessory housing.

2. A tube mounting assembly according to claim 1 wherein the N number of tubes is two, and wherein each of said brackets consists of a flat mounting flange with an integral upstanding flange at one longitudinal edge thereof, said flat mounting flange having two spaced apart parallel tube receiving slot openings extending from the opposite longitudinal edge thereof and having a fastener slot opening intermediate said tube receiving slot openings, each said mounting flange having a lock tab extending from opposite transverse sides thereof, and wherein said positioning tab means on each said fold-over clamp is a return bent tab integral with said second leg thereof at the end of said second leg opposite said bight, the said return bent tab being positioned to entrap said lock tab.

3. A tube mounting assembly for securing an N number of tubes to an accessory housing having an N number of bored passages to receive the tubes, each of the tubes being of the type formed with an external annular bead and a cylindrical pilot portion extending from one side of said bead to a free end thereof for insertion into a bored passage in the accessory housing, said tube mounting assembly including a fold-over clamp for each tube of the N number of tubes, each said fold-over clamp including a first apertured leg and a second bifurcated leg connected to each other at one end by an integral bight, said first apertured leg encircling the pilot tube portion of a tube with the apertured leg in abutment against the bead to provide a seat for an O-ring, the second bifurcated leg partly encircling the tube on the opposite side of the bead with the bead securely sandwiched between said first apertured leg and said second bifurcated leg to prevent rotation of the tube relative to said fold-over clamp, an O-ring positioned to encircle the pilot tube portion in abutment against said first apertured leg and, a split flange connector consisting of two brackets of identical shape secured together in interlocking relationship about said tubes, each said bracket having an N number of slot openings extending from one side thereof to receive said tubes and at least one slot opening to receive a fastener whereby said brackets can be secured to an accessory housing, said brackets encircling said tubes adjacent said second bifurcated leg of each said fold-over clamp, and positioning means associated with each of said fold-over clamps and with said brackets for retaining said fold-over clamps against rotation relative to said brackets.

4. A tube mounting assembly accordingn to claim 3 wherein the N number of tubes is two, and wherein each of said brackets consists of a flat mounting flange with an integral upstanding flange at one longitudinal edge thereof, said flat mounting flange having two spaced apart parallel tube receiving slot openings extending from the opposite longitudinal edge thereof and having a fastener slot opening intermediate said tube receiving slot openings, each said mounting flange having a lock tab extending from opposite transverse sides thereof, and wherein said positioning tab means on each said fold-over clamp is a return bent tab integral with said second leg thereof at the end of said second leg opposite said bight, the said return bent tab being positioned to entrap said lock tab.

* * * * *